United States Patent [19]

Dakin

[11] Patent Number: 4,703,368

[45] Date of Patent: Oct. 27, 1987

[54] MULTIPLE VARIABLE RATE AUDIO MESSAGE RECORDING AND PLAYBACK

[75] Inventor: Wayne R. Dakin, Huntington Beach, Calif.

[73] Assignee: Discovision Associates, Costa Mesa, Calif.

[21] Appl. No.: 782,803

[22] Filed: Oct. 2, 1985

Related U.S. Application Data

[63] Continuation of Ser. No. 342,292, Jan. 25, 1982, abandoned.

[51] Int. Cl.$^4$ .................. H04N 5/76; H04N 5/78; G11B 17/00
[52] U.S. Cl. .................. 358/342; 360/9.1; 360/72.2; 360/49
[58] Field of Search ............... 358/312, 335, 342, 343; 360/10.1–10.3, 14.2–14.3, 35.1, 32, 39, 49, 9.1, 48, 72.2; 369/44

[56] References Cited

U.S. PATENT DOCUMENTS

| | | | |
|---|---|---|---|
| 2,995,729 | 8/1961 | Steele | 364/200 |
| 3,412,382 | 11/1968 | Couleur et al. | 364/200 |
| 3,909,512 | 9/1975 | Omori et al. | 360/32 X |
| 4,142,209 | 2/1979 | Hedlund et al. | 369/44 X |
| 4,238,843 | 12/1980 | Carasso et al. | 358/342 X |
| 4,276,609 | 6/1981 | Patel | 364/900 |
| 4,286,281 | 8/1981 | Suzuki | 360/19.1 |
| 4,317,131 | 2/1982 | Jerome | 358/342 |
| 4,347,527 | 8/1982 | Lainey | 360/10.1 X |
| 4,348,699 | 9/1982 | Tsuchiya et al. | 360/32 |
| 4,353,090 | 10/1982 | Broadbent | 358/343 X |
| 4,402,021 | 8/1983 | Sonodee et al. | 360/49 X |
| 4,446,490 | 5/1984 | Hoshimi et al. | 360/32 |
| 4,473,850 | 9/1984 | Foerster et al. | 360/9.1 |

FOREIGN PATENT DOCUMENTS 55-49080 4/1980 Japan .................. 360/19.1

OTHER PUBLICATIONS

"Digital Still Store"; NEC Res. & Dev'lp (Japan) No. 53; Apr. '79; Miyagawa et al.

Primary Examiner—Aristotelis M. Psitos
Attorney, Agent, or Firm—Discovision Associates

[57] ABSTRACT

Method and apparatus for recording and playing back a plurality of digitally encoded audio messages along with associated video data. The messages are combined along with a plurality of corresponding audio message initial data address signals and recorded on a recording medium with the video data. In playback, the address and audio data signals are retrieved from the recording medium and stored. The address signals are utilized to access selectable messages for decoding and playback with selected video data. Codes can be included to control the decoding rate in accordance with the sample rate of the audio message data.

15 Claims, 6 Drawing Figures

MULTIPLE VARIABLE RATE AUDIO MESSAGE RECORDING AND PLAYBACK

CROSS-REFERENCE TO RELATED APPLICATION

This is a continuation of application Ser. No. 342,292, filed Jan. 25, 1982, now abandoned.

BACKGROUND OF THE INVENTION

1. Field of the Invention

The present invention relates to audio frequency information encoding and decoding, and more particularly relates to audio message encoding and recording on a recording medium for later retrieval, decoding and playback with related video information which is recorded with the audio information on the same recording medium.

2. Brief Description of the Prior Art

"Stop-motion" is a technique in the playback of recorded video information whereby a single frame of recorded video signals is played repeatedly to provide a continuous video picture of the visual information contained in the single frame being played. Stop-motion techniques are known and are in widespread use in TV broadcasting, the most well-known example being in the area of televised sports broadcasts. In such broadcasting applications, the recording medium generally used to create the stop-motion effect is the video tape.

A development which has made the stop-motion capability attractive for applications other than broadcasting is the optical disc. An optical disc is a flat disc approximately the size of an LP phonograph record which is made of clear plastic and is capable of having information recorded on an imbedded surface in the interior of the disc in form of spiralling or circular tracks of optically readable indicia. Optical discs are read by imaging a beam of light to a tiny spot on a track, rotating the disc and thus causing the spot of light to scan linearly along the track, and detecting with a photodetector the amount of light which emerges from the track in a selected direction. Information is stored in the disc in the pattern in which the indicia are provided on the track. As the disc is scanned by the spot of light, the amount of light which is detected varies in accordance with the alternate presence and absence of the indicia, and the information is recovered by detecting the electrical signal variations of the photodetector output produced by the particular pattern of indicia on the track.

The most widely-used format for the recording and playback of video information on an optical disc involves frequency modulating a video carrier and one or more audio subcarriers, combining the frequency-modulated carrier and subcarriers, and then varying the spatial frequency and relative length of the indicia, as compared with the areas between them, in accordance with the frequency-modulated carrier and subcarrier signals.

It is possible to record video information on an optical disc such that areas of the track corresponding to vertical sync intervals are aligned radially on the disc. Such discs are called Constant Angular Velocity ("CAV") discs because in the recording and playback of video information, such discs are rotated at a constant angular velocity.

CAV discs provide several useful features which result from the fact that the vertical sync intervals in every track on the disc line up in the same radial direction. This arrangement makes it possible while reading the disc to jump from track to track with relative ease while maintaining the synchronization of the horizontal and vertical sync oscillator circuits of the television or monitor being driven by the disc player output. This is made possible because, as the spot of light arrives at a new track after being jumped from a previous track, the synchronization of the video information recorded in that track is identical to the synchronization of the video information in the track from which the spot was just removed. Thus, after making such a jump there is no need to reestablish lost synchronization, and instead the playing of the video information can proceed smoothly and without interruption.

This capacity to jump smoothly among frames of video information has made the optical disc a highly suitable recording medium for video information intended for play in the stop-motion mode. For example, an entire optical disc can be recorded exclusively with stop-motion video information. In such a case each video frame recorded on the disc contains a different picture, and the disc can be read frame by frame, and thus picture by picture, as one would read a book, by playing each frame in stop-motion mode and accesing individual frames as desired. Considering that over 50,000 frames of video can be stored on a single side of a CAV disc, the utility of such a format is obviously very wide. For example, an entire department store catalog or an entire 100,000 picture educational program can be placed on a single optical disc.

Stop-motion features of the optical disc become even more attractive when combined with the capability of audio playback during the stop-motion playing of the video information.

Techniques have been devised for the recording of audio information for playback with a frame of stop-motion video. According to one technique, set forth in co-pending U.S. patent application Ser. No. 202,840, filed on Oct. 31, 1980, issued on July 31, 1984, as U.S. Pat. No. 4,463,389 in the name of Scott M. Golding and commonly assigned to the assignee of the present invention, "stop-motion audio" to be played back with an accompaying stop-motion frame of video is encoded in a digitized form, for example by adaptive delta modulation, and recorded on one of two available audio channels on the disc. During playback, prior to the playback of the associated stop-motion video frame, the digitally encoded stop-motion audio information is read from the audio channel and stored in a storage device such as a RAM. When the stop-motion frame is played, the digitized audio information is read out of the storage device, decoded and played along the stop-motion video.

One of the limitations of this technique is that the bit rate of the digitized audio data as it is read from the disc must be kept within the bandwidth limitations of the audio channel on which it is recorded. A typical value which has been used with this technique is a read bit rate of twelve kilohertz. When employing adaptive delta modulation, sampling bit rates in the encoding process are typically sixteen kilohertz or greater to provide desired intelligibility. Thus, according to this technique, the disc must be played in the normal mode of operation for a period of time just slightly longer than the duration of the stop-motion message in order to read the encoded stop-motion message in memory. The technique is therefore not useful for recording programs having a large number of closely-spaced stop-motion frames. It does, however, provide a relatively low-cost way of recording and playing back stop-motion audio information where stop-motion frames are provided at more widely-spaced intervals throughout the program.

A second technique, described in co-pending U.S. patent application Ser. No. 066,620, filed on Aug. 15, 1979, now abandoned in favor of Ser. No. 161,231, filed June 18, 1980, in the name of Wayne R. Dakin of the present invention and commonly assigned to the assignee of the present invention, also involves the encoding of stop-motion audio information, for example by adaptive delta modulation. However, the digitally encoded stop-motion audio information is recorded in the place of video information on one or more successive frames. The stop-motion audio information message is encoded at a desired sampling rate, such as sixteen kilohertz and then time compressed to a bit rate of 7.2 megahertz and encoded such that the bandwidth is within the capabilities of the video electronic circuitry. The encoded data is then provided in the place of the video information in the horizontal lines of the video frames. The large time compression of the digitized audio information permits the storage of stop-motion audio messages of a duration of up to eleven seconds in the video data portion of a single frame of video.

The electronic circuitry required to implement this second technique is more costly than that associated with the first technique described above, but the later techniques permits considerably more stop-motion audio message information to be stored on an optical disc. Thus, an optical disc can be formatted in an alternating sequence of stop-motion video frames and stop-motion audio frames to provide each video frame with a stop-motion audio message of up to eleven seconds in duration. This "video encoding" technique, therefore, represents an enormous improvement in the efficiency of storing digitally encoded stop-motion audio messages on an optical disc.

The video encoding technique has certain limitations, however. Program demands for stop-motion message duration vary considerably. Video programmers frequently require only two or three seconds for a particular stop-motion frame, but occasionally require a stop motion audio message of up to twenty seconds or more. This presents problems in selecting a format for the stop-motion audio information. For reasons of economy it is desirable to have a standard format for stop-motion audio information recording and playback so that video optical disc players having stop-motion capability do not have to be redesigned for every new program. A reasonable compromise standard format for stop-motion audio encoding is two successive frames of video field devoted to a single stop-motion audio message sampled at a rate of sixteen kilohertz. Such a format enables the storage and playback of stop-motion audio messages of up to twenty-two seconds in duration at a reasonable level of intelligibility. This permits the storage and playback of all but the most lengthy stop-motion audio messages in most program applications. However, most stop-motion audio messages are considerably less in length, some lasting for only two or three seconds, as was mentioned previously. For such stop-motion messages an enormous amount of storage capability is wasted. Even if only a single frame were to be devoted to a single stop-motion audio message, the eleven seconds afforded at a sixteen kilohertz bit rate would still be excessive for many stop-motion audio messages, and longer messages could not be recorded in such a format.

In addition, while a sixteen kilohertz bit rate in connection with adaptive delta modulation is one which provides a reasonable compromise between intelligibility and data packing density requirements, audio message information played back at a sixteen kilohertz sampling rate does not provide full fidelity. Frequently it is desirable to provide such increased intelligibility, but prior art techniques do not provide the flexibility to do so.

Accordingly, it will be appreciated that there is a need for a video recording and playback system having stop-motion audio recording and playback capabilities which overcome the above-noted limitations. In particular, there is a need for such a system which provides more flexibility in the provision of stop-motion audio messages on a recording medium while preserving standardization to permit the economical manufacture of the associated apparatus.

The present invention fulfills these needs.

SUMMARY OF THE INVENTION

The present invention resides in a method and apparatus for the recording and playback of audio messages along with selected video data. According to one aspect of the present invention, a method is provided for recording a sequential series of digitally encoded audio data signals onto a recording medium along with associated video data such that predetermined message portions of the audio data can be selectably recovered for separate decoding and playback with selectable portions of the video data.

On the recording medium, the recorded audio messages, together with associated recorded address data signals, form a block of composite data. The block of composite data is arranged in a prescribed manner so as to aid in recovery and playback of a selected audio message with convenience and high efficiency. This is accomplished in the following manner. Each audio message is preceded by an identification address, and the combination of the identification address and associated audio message is referred to herein as an audio message unit. Thus, there is recorded on the medium a continuous stream of digitized audio data defining up to eight separate audio message units, in a preferred embodiment.

At the head of each block of composite data, before the first message unit, is a header containing a number of message pointers equalling the number of message units in the block. Each message pointer contains an address that is the same as the identification address of its corresponding message unit in the series of message units.

The block of composite data is recorded along with the visual-video data onto the recording medium, such that the composite data is recoverable from the recording medium for storage at predetermined addressable storage locations, and such that the addresses of the predetermined storage locations are correlated with the identification addresses of the stored message units. That is, when the block of composite data is stored in the memory device of the player, the message units are stored at locations determined by the respective identification address of each message unit. According to the invention, when a particular audio message is to be played, a memory pointer is selected by the user; the selected memory pointer, containing the address of a corresponding message unit stored in the memory, enables the message unit to be retrieved from the memory location having the same address; and the audio message is then separated from the identification address to be decoded and played back through the audio channel of the player while viewing selected viewable-video data.

According to another aspect of the present invention, a method is provided for recording a sequential series of digital audio data signals, encoded at a predetermined variable sampling rate onto a recording medium along with associated video data signals, such that the audio data signals are recoverable for decoding at the predetermined variable sampling rate and for playback with the video data. A predetermined digital signal representative of the predetermined sampling rate is generated and combined with the audio data signals in a predetermined relative relationship therewith to form a composite group of digital signals. The composite group of digital signals is recorded along with the video data signals such that the predetermined digital signal is recoverable from the group of digital signals for setting the sampling rate for decoding the encoded audio to the predetermined variable sampling rate. The composite group of audio data signals is recovered from the storage medium during playback and then stored in a memory. The predetermined digital signal is recovered and the information therein relating to the predetermined sampling rate is used to set the bit rate of a decoder. The audio data signals are decoded at the predetermined sampling rate and the recovered audio is played with a predetermined portion of the video data.

It will be appreciated from the foregoing that the present invention represents a significant advance in the field of stop-motion audio recording and playback systems, as well as in audio data storage systems in general. In particular, the invention provides an effective technique for the storage of stop-motion audio messages for later playback with associated stop-motion video data such that considerably expanded flexibility in quality and duration of such messages is provided as compared with prior art techniques. Other aspects and advantages of present invention will become apparent from the following more detailed description, taken in conjunction with the accompanying drawings.

BRIEF DESCRIPTION OF THE DRAWINGS

FIG. 3, consisting of A and B, is a diagram of the data structure of a RAM loaded with data in accordance with the principles of the present invention.

FIG. 4, consisting of A and B, is a schematic diagram of the control circuit shown in FIG. 1.

DETAILED DESCRIPTION OF THE PREFERRED EMBODIMENT

Figure 1:
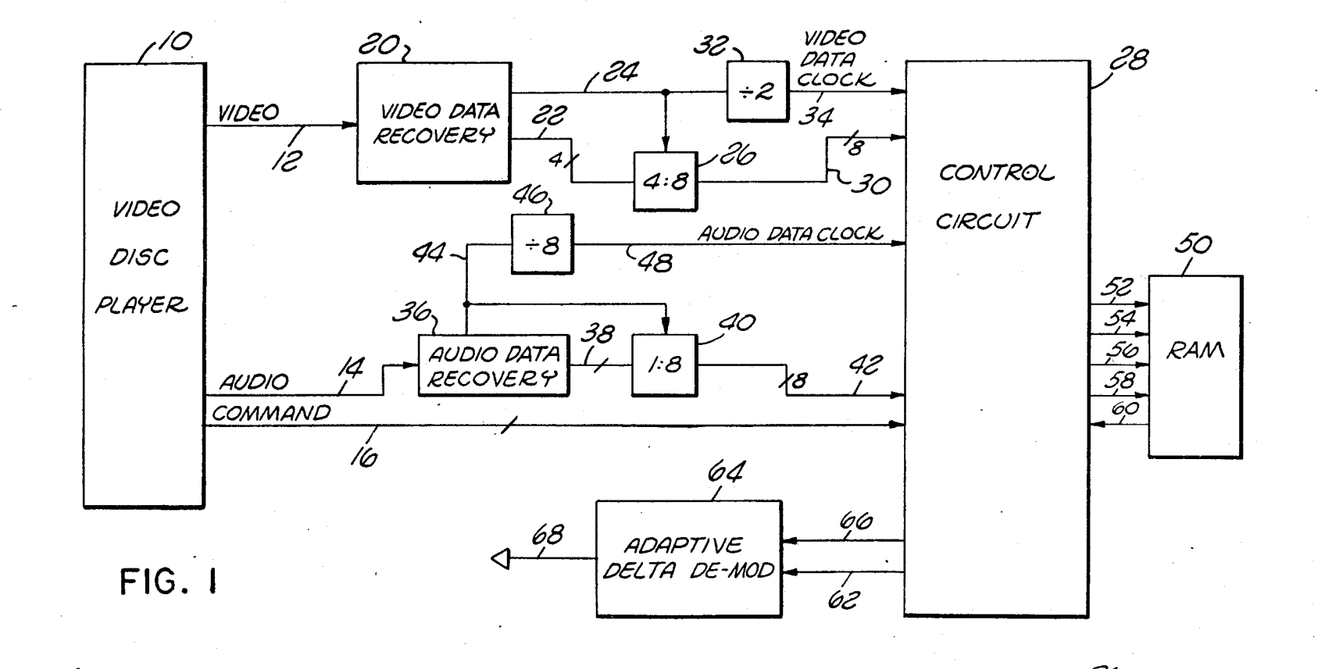
FIG. 1 is a block diagram of a stop-motion audio decoder constructed according to the principles of the present invention.

FIG. 1 is a block diagram of a stop-motion audio data recovery and demodulation apparatus constructed according to the principles of the present invention. A standard video disc player apparatus 10 reads an optical disc (not shown) and provides as outputs a video signal line 12 carrying recovered video information, and audio signal line 14 carrying recovered audio information from Audio Channel 2, which is one of the two audio channels provided on the videodisc and a Command signal line 16. The video signals on line 12 are applied to a video data recovery circuit 20.

The video data recovery circuit 20 processes the video signal input on line 20 and provides as outputs four parallel lines of digitally encoded audio data at logic level, recovered from two successive frames of video. The recovery circuit 20 also provides a clock signal as an output on line 24, which is the clock rate of the encoded data output on line 22. The clock pluses on line 24 are applied to a conventional four-bit parallel to eight-bit parallel converter 26, which converts the four-bit parallel data input on line 22 into eight-bit parallel data ("Video Coded Data"), which is applied to a control circuit 28 on line 30. The clock pulses on line 24 are also applied to a conventional divided-by-two circuit 32, the output of which ("Video Clock Data") is applied to the control circuit 28 on line 34. The details of the circuitry in the video data recovery circuit 20 are set forth in copending U.S. patent application Ser. No. 218,584, filed on Dec. 19, 1980 in the names of Jordan Isailovic and Wayne Ray Dakin and commonly assigned to the assignee of the present invention.

The audio signal on line 14 is applied to an audio data recovery circuit 36, which recovers digitally encoded audio data as a serial bit stream at logic level from the audio signal on line 14. The encoded audio data is applied as an output on line 38 to a conventional serial to eight-bit parallel converter 40, which converts the serial stream of encoded audio data on line 38 into eight-bit parallel data ("Audio Coded Data"), which is applied to the control circuit 28 on line 43. The audio data recovery circuit 36 also provides as an output on line 44 a clock signal at the rate of recovered Audio Coded Data, which is applied to the serial-to-parallel converter 40. The clock signal on line 44 is applied to a conventional divide-by-eight circuit 46 which divides the clock pulse stream by eight and applies the resultant output ("Audio Clock Data") to the control circuit 28 on line 48. The details of the principles of construction and operation of the audio data recovery circuit 36 are provided in the aforementioned copending U.S. patent application Ser. No. 202,840, now U.S. Pat. No. 4,463,389.

The control circuit 28 communicates in conventional manner with a 48K RAM 50 by way of a WRITE CLOCK line 52, WRITE DATA line 54, RAM ADDRESS line 56, READ CLOCK line 58 and READ DATA line 60. The control circuit 28 applies data retrieved from the RAM 50 on a line 62 to an adaptive delta demodulator 64. Clock pulses are also applied on line 66 to the adaptive delta demodulator for decoding the retrieved data on line 62 at the appropriate rate. The recovered adaptive delta demodulated audio is applied on an output line 68 for subsequent filtering and amplification for playing with associated video.

The Video Coded Data on line 30 and the Audio Coded Data on line 42 are clocked at different rates. The Video Coded Data on line 30 is clocked at a rate of approximately 900 kHz, while the Audio Coded Data on line 42 is clocked at a rate of approximately 1,500 Hz. Both the Video Coded Data and Audio Coded Data, however, have the same format.

Figure 2:
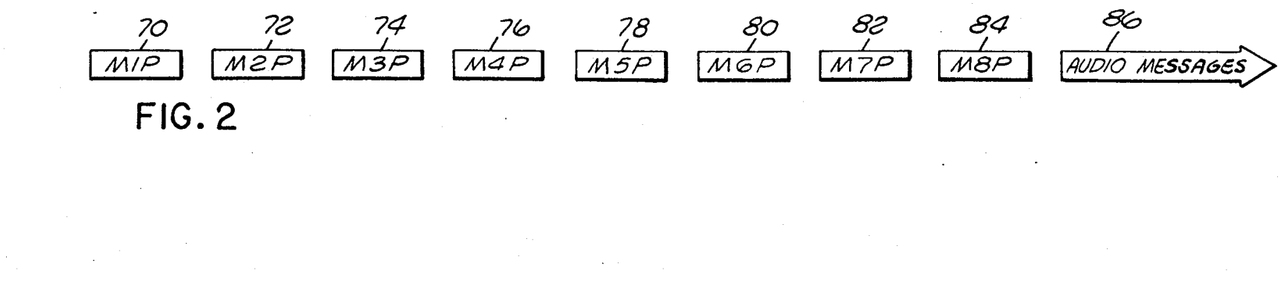
FIG. 2 is a diagram of the format of a block of encoded audio data which is used in connection with the present invention.

FIG. 2 is a block diagram which shows the format of the Audio Coded Data and Video Coded Data. At the beginning of a block of either Video Coded Data or Audio Coded Data, a series of sixteen-bit message unit pointers 70–84 are provided, which together comprise a "Header" 88 of data. Following the Header 88, continuous stream of digitized Audio Data 86 is provided. The Audio Data 86 is comprised of up to eight separate audio message units appearing serially to make up the entire segment of Audio Data 86. The message unit pointers 70-84 each comprise a sixteen-bit byte, which is a digital number corresponding to the position of the first byte of data in an associated audio message unit in the segment of Audio Data 86, and to the sampling rate of the data in the unit. Because the block of Audio Coded Data or Video Coded Data is loaded serially into the 8-bit storage locations in the RAM 50, starting with address 0000, the message pointers are selected to include the RAM address of the first 8 bits of data in the associated message unit when the data is loaded in the RAM 50 in this way.

In operation, a block of Video Coded Data or of Audio Coded Data is read into the RAM 50 by the control circuit 28 in response to a command signal on Command line 16. Subsequently, in response to a further command signal on line 16, a selected message pointer is retrieved and processed to obtain the address of the first 8 bits of the associated message unit and the sampling rate of that unit of data. Subsequently, the portion of the Audio Data 86 corresponding to the entire audio message unit selected is retrieved from the RAM 50 and clocked out at an appropriate rate to the adaptive delta demodulator 64 where the audio message unit data is demodulated and output on line 68 for further processing.

Figure 3A:
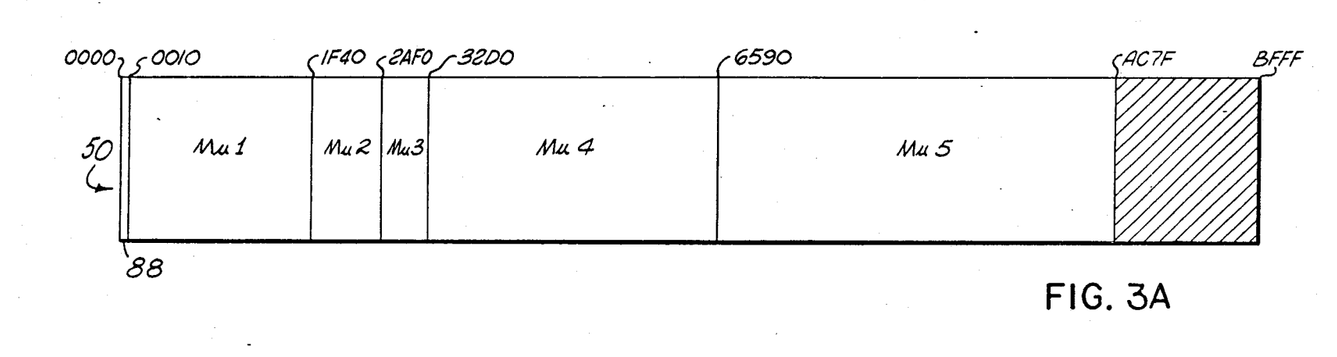

FIG. 3A depicts the structure of data stored in the RAM 50 memory after it is loaded with a block of either Audio Coded Data or Video Coded Data. In the diagram, the RAM 50 storage location designated "0000" is at the leftmost portion of the diagram, and storage locations having sequentially increasing addresses proceed from the left to the right. All addresses are expressed in Hex notation. Thus, the addresses of the available storage in the 48K RAM 50 proceed from 0000 to BFFF.

The data is stored in the RAM 50, as depicted in FIG. 3A, such that the Header 88 occupies a portion of RAM 50 memory having address 0000 to 000F. A portion of audio data corresponding to a first message unit "Message Unit 1", occupies an area of storage from address 0010 through 1F3F. Message Unit 2 occupies storage locations having addresses 1F40 through 2AEF, and so on. In all, five mesage units, MU1-MU5, are loaded in RAM 50.

Figure 3B:
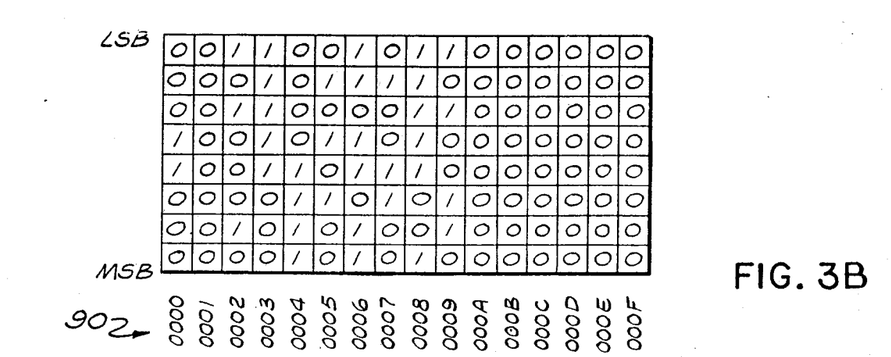

FIG. 3B is an expanded diagram of the portion of RAM 50 memory containing the Header 88 previously discussed. The data 88 occupies 16 eight-bit portions of memory having associated addresses 90, indicated below each vertical column representing each eight-bit storage location of RAM 50 memory. Data is arranged in the figure in each memory location such that the least significant bit appears at the top of the column, and the most significant bit appears at the bottom.

As was mentioned previously in connection with FIG. 2, each message unit pointer 70-84 comprises a sixteen-bit byte. Thus, each message unit pointer occupies 2 eight-bit storage locations in the RAM 50. Message 1 pointer occupies memory at addresses 0000 and 0001, Message 2 pointer 72 occupies storage locations having addresses 0002 and 0003, and so on. RAM 50 memory having address 000A through 000F are not needed in this example to store further message pointers and are consequently loaded with zeros.

It will be noted that the Hex notation addresses of the first eight bits of data for each of the five message units 1-5 are, from FIG. 3A, 0010, IF40, 2AF0, 32D0, and 6590, respectively. However, the message unit pointers 1-5 stored in the Header 88 portion of the RAM 50 are, from FIG. 3B, 0018, 1F45, 2AF0, 32DB and 659F, respectively. Thus, it will be appreciated that while the three most significant Hex digits of the message unit pointers correspond to the three most significant Hex digits of message unit addresses, the least significant digit may not correspond. In fact, all of the least significant digits of the message unit addresses are 0, and the least significant digit of the message unit pointer is used to designate the sampling rate for the Audio Data in the message unit of the associated pointer. The sampling rate code is described in detail below.

Figure 4A:
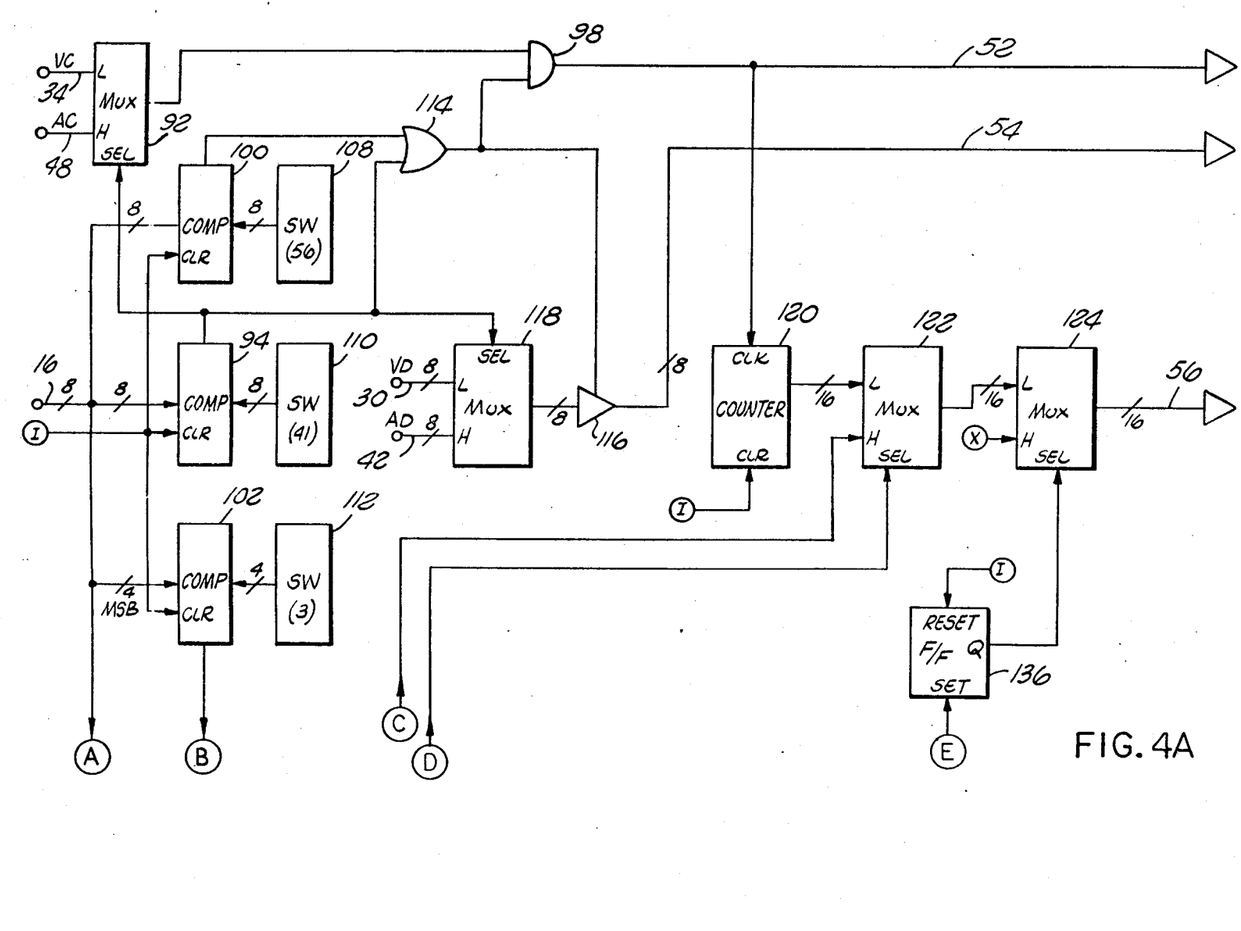
Figure 4B:
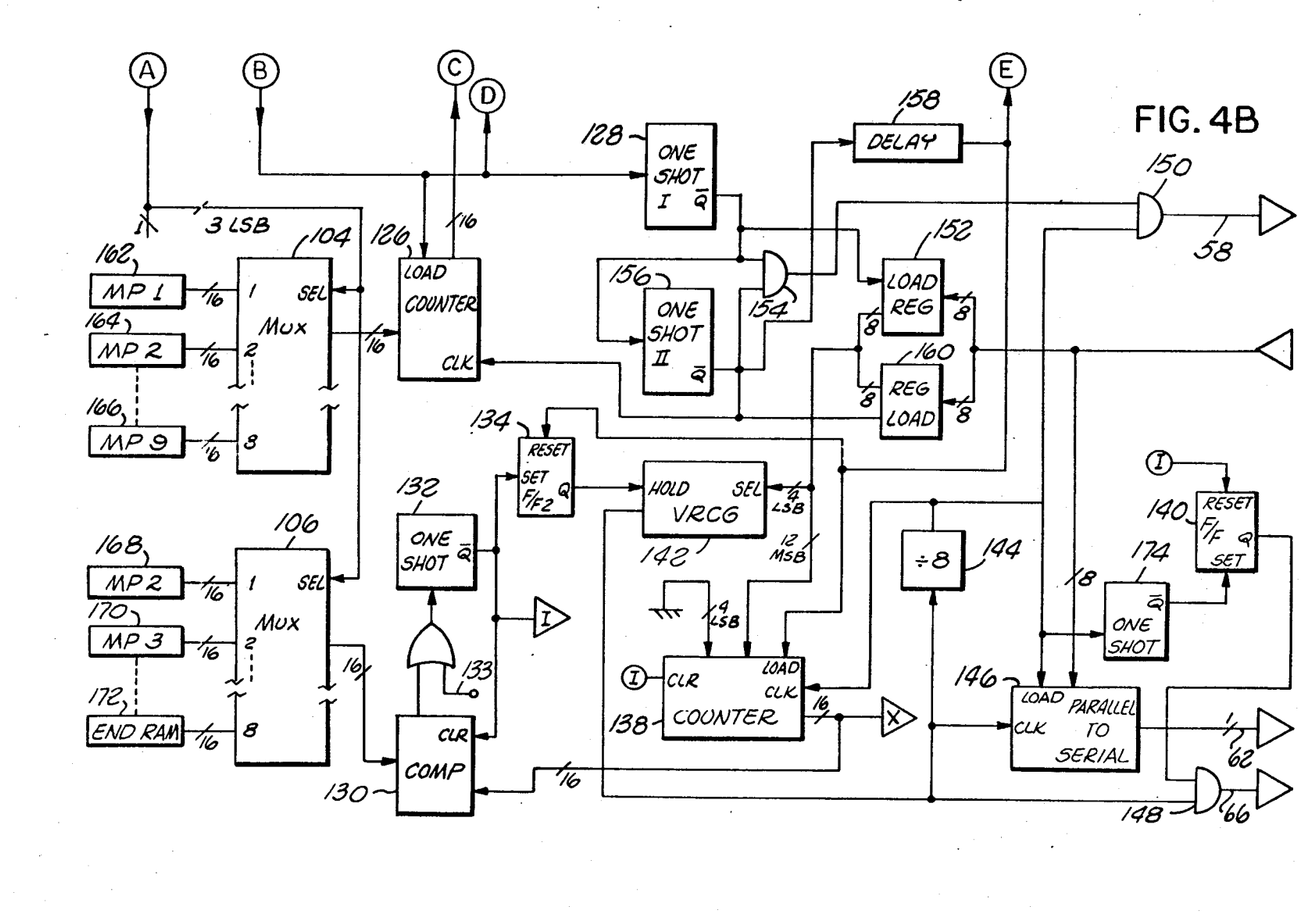

FIG. 4 is a circuit diagram of the control circuit 28 of FIG. 1. The Video Clock line 34 is connected to the Low input of a first multiplexer 92, and the Audio Clock line 48 is connected to the High input of multiplexer 92. The Select input of multiplexer 92 is connected to the output of a comparator 94. The output of multiplexer 92 is connected to one input of an AND gate 98, the output of which is connected to line 52. The eight-bit command line 16 is connected to a first input of comparator 94 as well as to first inputs of further comparators 100 and 102 and to the Select inputs of a second multiplexer 104 and a third multiplexer 106. A switch 108 set to the Hex notation number 56 ("Hex 56") is connected to the second input of comparator 100. A switch 110 set to Hex 41 is connected to the second input of comparator 94, and a switch 112 set to Hex 3 is connected to the second input of comparator 102. The output of comparator 100 is connected to a first input of an OR gate 114, the output of which is connected to the second input of AND gate 98 and to the control input of a tri-state buffer 116. The output of comparator 94 is connected to the Select input of the multiplexer 92, as was mentioned previously, and also to the second input of OR gate 114 as well as to the Select input of a second multiplexer 118.

The Video Coded Data line 30 is connected to the Low input of multiplexer 118, while the Audio Coded Data line 42 is connected to the High input of multiplexer 118. The output of multiplexer 118 is connected to the input of the tri-state buffer 116. The output of the tri-state buffer 116 is connected to line 54. The output of AND gate 98 is also connected to the Clock input of a sixteen bit counter 120. The output of the counter 120 is connected to the Low input of a fourth multiplexer 122, the output of which is connected to the Low input of a fifth multiplexer 124. The output of multiplexer 124 is connected to line 56.

The output of comparator 102 is connected to the Load input of a further sixteen bit counter 126, the rising edge input of a one shot 128 and to the Select input of multiplexer 122. The output of counter 126 is connected to the High input of multiplexer 122. The output of multiplexer 104 is connected to the input of counter 126, while the output of multiplexer 106 is connected to the input of a further comparator 130.

The output of comparator 130 is connected to the first input of an OR gate 131, the output of which is connected to the rising edge input of a one shot 132. The second input of OR gate 131 is connected to an external line 133. The Q̄ output of one shot 132 comprises an initialize pluse and is connected to the CLEAR input of comparator 130, to the SET input of a first flip-flop 134, to the CLEAR input of counter 120, and to the RESET input of a second flip-flop 136. The output of one shot 132 is also connected to the CLEAR Inputs of comparators 94, 100 and 102, as well as to the CLEAR Input of a further sixteen-bit counter 138 and to the RESET input of a third flip-flop 140.

The Q output of flip-flop 134 is connected to the HOLD Input of a Variable Rate Clock Generator 142. The output of the Clock Generator 142 is connected to the input of a divide-by-eight device 144, to the CLOCK input of a parallel-to-serial converter 146, and to a first input of a further AND gate 148. The output of the divide-by-eight device 144 is connected to the LOAD input of the parallel-to-serial converter 146, to the SET input of the third flip-flop 140, to one input of a further AND gate 150, and the CLOCK input of counter 138. The Q output of flip-flop 140 is connected to the second input of AND gate 148, the output of which is connected to line 66. The output of the parallel-to-serial converter 146 is connected to line 62.

The output of counter 138 is connected to the second input of comparator 130 and to the HIGH input of multiplexer 124. The output of multiplexer 124 is connected to line 56.

The $\overline{Q}$ output of one shot 128 is connected to the LOAD input of a register 152, to a first input of a further AND gate 154, and to the rising edge input of a second one shot 156. The e,ovs/Q/ output of one shot 156 is connected to the second input of AND gate 154, the output of which is connected to the second input of AND gate 150. The output of AND gate 150 is connected to line 58. The $\overline{Q}$ output of one shot 156 is also connected to the input of a delay line 158, to the LOAD input of a further register 160, and to the CLOCK input of counter 126.

The output of the delay device 158 is connected to the SET input of flip-flop 136, to the LOAD input of counter 138, and to the RESET Input of flip-flop 134. The Q output of the second flip-flop 136 is connected to the SELECT input of multiplexer 124.

Line 60 is connected to the input of the parallel-to-serial converter 146 and also to the inputs of registers 152 and 160. The eight-bit parallel line output of register 152 and the eight-bit parallel line output of register 160 are combined to form a single sixteen-bit parallel line 161, the four least significant bits of which are connected to the SELECT input of the clock generator 142 and the twelve most significant bits of which are connected to the input of counter 138.

Multiplexer 104 and multiplexer 106 are each 8:1 multiplexers which select among eight inputs according to a binary number present at the SELECT inputs thereof. The first input of multiplexer 104 is connected to a switch 162 set to the RAM 50 address of the first eight bits of the first message unit pointer. The second input of multiplexer 104 is connected to a switch 164 set to the RAM 50 address of the first eight bits of the second message unit pointer, and so on, up to switch 166 set to the RAM 50 address for the first eight bits of the eighth message unit pointer and connected to the eighth input of mulitplexer 104.

The first input of multiplexer 106 is connected to switch 168 set to the RAM 50 address of the first eight bits of the second message unit pointer. The second input of multiplexer 106 is connected to a switch 170 set to the RAM 50 address for the first eight bits of the third message unit pointer 170, and so on, up to the seventh input of the multiplexer 106. The eighth input of the multiplexer 106 is connected to a switch 172 set to the RAM 50 address corresponding to the end of the RAM 50 storage area used to store the stop motion audio data.

Before proceeding with a description of the operation of the circuit shown in FIG. 4, the format of the sampling rate code mentioned previously should be understood. The following table, Table 1, sets forth the sampling rate code:

TABLE 1

| Sampling Rate Code | |
|---|---|
| Hex Bit Value | Sampling Rate (KHz) |
| 0 | 13 |
| 1 | 14 |
| 2 | 15 |
| 3 | 16 |
| 4 | 17 |
| 5 | 18 |
| 6 | 19 |
| 7 | 20 |
| 8 | 21 |
| 9 | 22 |
| A | 23 |
| B | 24 |
| C | 25 |
| D | 26 |
| E | 27 |
| F | 28 |

It will be recalled that Message Unit Pointers 1–5 comprise the following Hex numbers: 0018, 1F45, 2AF0, 32DB, and 659F. The least significant digit in each of the pointers comprises the sampling rate code for the associated Message Unit. Thus, referring to Table 1, the sampling rate for the first Message Unit is 21 KHz, that for the second Message Unit, 18 KHz, that for Message Unit 3, 13 KHz, and so on.

The format of the command codes transmitted on command line 16 should also be understood. The following table, Table 2, sets forth the command code:

TABLE 2

| Command Code | |
|---|---|
| 56 | Get Video Coded Data |
| 41 | Get Audio Coded Data |
| 31 | Play Message Unit 1 |
| 32 | Play Message Unit 2 |
| 33 | Play Message Unit 3 |
| 34 | Play Message Unit 4 |
| 35 | Play Message Unit 5 |
| 36 | Play Message Unit 6 |
| 37 | Play Message Unit 7 |
| 38 | Play Message Unit 8 |

A Get Video Coded Data command signal (Hex 56) activates the control circuit 28 to receive Video Coded Data and read it into the RAM 50. A Get Audio Coded Data command signal (Hex 41) activates the control circuit 28 to receive Audio Coded Data and read it into the RAM 50. The Play Message 1–8 command signals (Hex 31–38) activate the circuit to retrieve Message Units 1–8, respectively, from the RAM and clock them out at the appropriate rate to the adaptive delta demodulator.

The circuit shown in FIG. 4 operates in the following manner.

Initially, on power up of the system a logic level "1" pulse is generated in a conventional manner and applied to line 133. This clears the comparators in the circuit and sets the circuit to a ready conditions to receive a block of data.

If a block of Video Coded Data is to be received from the player 10 (FIG. 1) a Get Video Coded Data command code which, from table 2 is the Hex number 56, is applied to the 8 bit command data line 16. The Get Video Coded Data code is generated just prior to the reading of the block of Video Coded Data from the disc. Since it will always be known where on a given disc a block of encoded Video Coded Data is recorded, it is a simple matter to control the timing of the appearance of the command signal on line 16. For example, if a block of Video Coded Data is recorded in the video portion of the 10,000th and 10,001st frames, the conventional circuitry within the video disc player 10 may be utilized to generate a signal at the start of the 10,000th frame which can be used to apply the code 56 to the command line 16 at the begining of the two frames. The matter of controlling the sequencing and timing of the command signal is a matter well within the scope of one skilled in the art.

When the Hex number 56 appears on line 16 comparator 100 detects equivalence between the first and second input and consequently produces an output which is applied to one input of OR gate 114. The OR gate 114 produces an output which is applied to one input of AND gate 98 and also to the control input of a tristate buffer 116. Comparator 94 produces no output at this time and therefore the select input of multiplexer 92 will be "low". When video clock data re applied on line 34 to the multiplexer 92 the multiplexer 92 will therefore select the video clock pulses and pass them through to the output of the multiplexer 92. These pulses are applied to the second input of AND gate 98 and, because the first input of the AND gate 98 is held high, the pulses are passed through and appear on line 52. Line 52 is connected to the read data clock input of RAM 50 (FIG. 1).

Because comparator 94 has a low output at this time multiplexer 118 selects the video input line 30 and passes it through to the tristate 116 which, due to high state of the output OR gate 114, passes the video data through to line 54. Line 54 is in turn connected to the WRITE data input of RAM 50 (FIG. 1).

The output of AND gate 98 is also applied to the clock input of 16 bit counter 120. Having been cleared initially by the Initialize pulse on line 18, the counter 120 begins counting from 0 and applies the count output to the Low input of multiplexer 122.

The net result of the previously described sequence is that the video data appearing on line 30 is clocked into the RAM at the clock rate determined by the video clock pulses on line 52 at a sequential series of address locations starting with 0000 which appear on line 56.

The receipt and storage of a block of Audio Coded Data is performed in substantially the same manner by the control circuit 28 as that described for the receipt and storage of a block of Video Coded Data. However, in the case of the processing of Audio Coded Data, the output of comparator 94 is "high" and therefore the Select inputs of multiplexer 92 and multiplexer 118 are "high". Thus, the Audio Clock on line 48 and the Audio Coded Data on line 42 are passed through to lines 52 and 54, respectively. Addresses are generated and applied on line 56 in the same way.

A message unit is retrieved and read out in the following manner. Assume that it is desired to play message unit 2 with a selected frame of video in the stop motion mode. Using known techniques the player apparatus is caused to play the selected video frame in the stop motion mode. Simultaneously, Hex 32, corresponding to the Play Message Unit Two command signal, is generated and applied to the command line 16. The three least significant bits of the command are applied to the SELECT inputs of both multiplexer 104 and multiplexer 106. The three least significant bits of Hex 32 comprise the digital number "2" which, when applied to the SELECT input of multiplexer 104, selects the second input connected to switch 164. Switch 164, it will be recalled, is set to the address in RAM 50 of the second message unit pointer. This is applied to the output of multiplexer 104 which is connected to the input of counter 126.

Simultaneously, the four most significant bits of Hex 32 are applied to the first input of comparator 102. Comparator 102 senses coincidence between that input and the outer of switch 112 which, it will be recalled, is set to the number 3. Coincidence causes the output of comparator 102 to go "high". This high signal is applied to the LOAD input of counter 126 which, in response loads the second message unit pointer value at the output of multiplexer 104 into the counter.

The high output of comparator 102 is also applying to the SELECT input of multiplexer 122 which, in response, selects the HIGH input connected to the output of counter 126. Thus, counter 126 which is at this time set to the digital value corresponding to the second message unit pointer address in RAM 50 is applied through multiplexer 122 and multiplexer 124 to line 56.

As the output of comparator 102 goes from a low value to a high value, one shot 128 is triggered. It will be noted that the $\overline{Q}$ outputs of one shot 128 and one shot 156 are connected to the input of AND gate 154. Consequently, the normal state for the output of AND gate 154 is "high". When one shot 128 is triggered, it applies the negative going pulse to one input of AND gate 154, causing a negative going pulse to appear on the output of AND gate 154. Because the output of divide-by-eight 144 is normally "high", the negative going pulse appearing on the output and gate 154 is transmitted through AND gate 150 and appears on line 58. The appearance on line 56 of the address of the second message unit pointer and the concurrent appearance of the negative going pulse on line 58 cause the RAM 50 to provide on line 60 the contents of the RAM storage area having the address of the first half of the second message unit pointer. The negative going pulse at the $\overline{Q}$ output of one shot 128 is also applied to the LOAD input of register 152 which causes the eight bits retrived from the RAM 50 on line 60 to be stored in register 152. When the negative going pulse at the $\overline{Q}$ output of one shot 128 ends, it triggers the rising edge input of one shot 156. This causes a negative going pulse having a duration of 500 nanoseconds to appear at the $\overline{Q}$ output of 156. This negative going pulse is applied to one input of AND gate 154 which causes a negative going pulse to appear at the output of AND gate 154 and, in turn, at the output of AND gate 150. Simultaneously, the negative going pulse at the $\overline{Q}$ output of one shot 156 is applied to the CLOCK input of counter 126 which, in response, increments by one. This has the effect of increasing by one the pointer number appearing on the address line 56. Consequently, the second eight bits of the second message unit pointer is retrieved from the RAM 50 and applied to the line 60. Finally, the negative going pulse output at the $\overline{Q}$ output of one shot 156 is applied to LOAD input of register 160 causing the second eight bits of the second message unit pointer to be loaded in register 160.

The net result of the sequence just described is that the entire second message unit pointer is loaded in combination in register 152 and 160. The output of comparator 102 is low at this time and therefore multiplexer 122 selects the LOW input and passes the count output of counter 120 through to the LOW input of multiplexer 124. Because flip-flop 136 is initially reset by the application of the Initialize pluse from one shot 132 the SELECT input of multiplexer 124 is low and, consequently, the multiplexer 122 output is passed through to line 56. Line 56, it will be recalled, is connected to the RAM ADDRESS input of RAM 50.

The twelve most significant bits of the second message unit start addresses appearing at the output of registers 152 and 160 are applied to the input of sixteen-bit counter 138. The 4 least significant bits of the output of registers 152 and 160 is applied to the SELECT input of Variable Rate Clock Generator 142.

The counter 138 is thus prepared to be loaded with the start address, corresponding to the first 8-bits of the second message unit data. This address value is loaded into the counter 138 and applied to the RAM 50 in the following manner. The negative going pluse at the $\overline{Q}$ output of one shot 156 is applied to a one microsecond delay circuit 158 which delays the negative going pulse by one microsecond and then applies it to the SET input of flip-flop 136 and to the LOAD input of counter 138. Thus, in response to the negative going pulse at the $\overline{Q}$ output of one shot 156, counter 138 is loaded with the second message unit start address and this address is applied to the HIGH input of multiplexer 124. Simultaneously, flip-flop 136 is set and its $\overline{Q}$ output is applied the SELECT input of multiplexer 124 causing it to select the HIGH input to which the output of counter 138 is connected. This causes the start address to be applied to line 56.

The delayed output of delay 158 is also applied to the RESET input of flip-flop 134 causing the $\overline{Q}$ output of flip-flop 134 to go low, releasing the Variable Rate Clock Generator 142. The four least significant bits of the second message unit start address, which comprise the sample rate code number, are present at this time at the SELECT input of the Clock Generator 142 which, when released from hold, produces as an output a clock at the rate selected in accordance with the code at the input of the generator 142.

The clock from Clock Generator 142 is applied to the input of the divided-by-eight device 144. Following eight counts of this clock an output appears at the output of divide-by-eight 144 which is applied to one input of AND gate 150. This causes a negative going pulse to appear on line 58 which causes the data at the start address storage location in RAM 50 to appear at line 60.

This data on line 60 is applied to the input of parallel-to-serial converter 146 and loaded immediately because of the presence of the output of divide-by-eight 144 at the LOAD input of 146. The loaded data is immediately clocked out serially in response to the clock pulses appearing at the CLOCK input of the converter 146 from the output of Clock Generator 142. The serially clocked out data is applied to line 62.

After four CLOCK pulses from Clock generator 142, the output of divide-by-eight 144 goes low. This causes the output of AND gate 150 to go low, thereby instructing the RAM 50 to read the data at the address which is present on line 56. The data which is thus read is supplied on line 60 and is thereby applied to the input of the parallel-to-serial converter 146. During this time period, the clock output from Clock Generator 142 is applied to one input of AND gate 148. However, the other input of AND gate 148 is held low by the Q output of flip-flop 140, and consequently, the clock from Clock Generator 142 is inhibited from appearing on line 66. The first 4 pulses from Clock Generator 142 are also applied to the clock input of parallel-to-serial converter 146, and thus random data is clocked out on line 62. This output is not processed by the demodulator, however, since no clock pulses appear at this time on line 64.

After four more clock pulses from clock Generator 142, the output of divide-by-eight 144 goes high. This triggers the CLOCK input of counter 138, triggers the Load input of the parallel-to-serial converter 146, and triggers the input of one shot 174. One shot 174 is set to produce an output pulse having a duration of 100 nanoseconds. Thus, as the output of divide-by-eight 144 goes high, the counter 138 is incremented by one thereby causing the address appearing on line 56 to be incremented by one, data is loaded into the parallel-to-serial converter 146, and one shot 174 is triggered thereby producing a negative-going pulse which activates the set input of flip-flop 140. The Q output of flip-flop 140 thus goes high, enabling a string of clock pulses from the clock generator 142 to appear on line 64. Consequently, data is immediately clocked out of the parallel-to-serial converter onto line 62, and simultaneously clock pulses are provided on line 64.

Following four more clock pulses from Clock Generator 142, the output of divide-by-eight 144 again goes low. This causes another negative-going pulse to appear on line 58 which causes the RAM 50 to access data from the storage location having the address location appearing on line 56 which, it will be appreciated, is next storage location in the sequence of the second message unit. After four more pulses at the output of Clock Generator 142, all of the data previously loaded in the parallel-to-serial converter 146 is completely clocked out onto line 52. Coincident with the output of divide-by-eight 144 going high, the parallel-to-serial converter 146 is loaded with the next eight bits of data which are present on line 60, counter 138 is incremented by one, and one shot 174 is triggered. Thus, the next eight bits of data are immediately clocked out onto line 62 with no interuption from the clocking of the first eight bits of data. Flip-flop 140 already having been set by the first positive-going edge appearing at the output of divide-by-eight 144, the Q output of flip-flop 140 remains high and the stream of clock pulses continues to appear on line 66 without interuption.

The output of counter 138, in addition to being applied through multiplexer 124 to line 56 to provide the address information for the RAM 50, is also applied to one input of comparator 130. The other input of comparator 130 is connected to the output of multiplexer 106. Multiplexer 106, it will be recalled, has at its output the third message unit pointer set in switch 170. Counter 138 continues to increment with every cycle of the output divide-by-eight 144 thereby clocking, storage location by storage location, the entire contents of that portion of RAM 50 memory containing the data associated with the message unit being accessed, in this example being the second message unit.

When the output of counter 138 equals the subsequent message unit pointer, in this example message unit number 3, comparator 130 detects coincidence and produces an output. This output is applied to the input of one shot 132 which produces a one microsecond negative-going output pulse on the $\overline{Q}$ output thereof. This negative going output pulse is appied to the SET input of flip-flop 134 which causes the Q output of flip-flop 134 to go high. This causes the HOLD input of Variable Rate Clock Generator 142 to go high which inhibits Clock Generator 142. Simultaneously, the negative-going output pulse from one shot 132 is applied to the Initialize line, thereby clearing and resetting the various devices responsive to the Initialize pulse, returning the circuit to its initial state awaiting a further command.

Thus, it has been shown that units of encoded audio data comprising message units capable of being decoded at an associated particular clock rate for separate playback with selected video frames played in the stop motion mode can, according the principles of the present invention, be grouped together along with specially encoded message unit pointers to form a block of encoded audio message data which may be recorded on a recording medium, such as a video disc, on either a portion of the disc reserved for video information or on a portion of the disc reserved for audio frequency information. This block of data can be recovered from the disc, stored in a storage device such as a RAM and selectively accessed from the storage device and processed for controllable separate playback of each message unit with a selected frame of video played in the stop motion mode. In fact, the present invention provides sufficient flexibility over the control of the access and processing of the message units that the separate message units may be played back not only when a single selected frame of video is played in a stop motion mode, but in addition during any desired mode of video disc playback, for example, slow motion playback or skip frame playback.

It should be noted that while the control circuit 28 described above provides an effective means for coordinating the storage and selective accessing of data according to the principles of the present invention, it may be more cost effective to implement the logic contained in control circuit 28 in the program of a microprocessor, and have the microprocessor exercise the function of the control circuit. Such an implementation is, in fact, considered preferred. The details of the procedure for programming a microprocessor in this manner are not included herein, since such procedures are well known in the art and the derivation of an effective program for this function for a particular microprocessor is considered routine once the principles divulged herein are known.

It will be appreciated from the foregoing that the present invention represents a significant advance in the field of extraordinary mode audio recording and playback, especially as applied to the field of stop motion audio information recording and in playback. In particular, the invention provides an effective technique for providing expanded flexibility in the efficient storage of encoded audio data in the form of separate audio data message units, and in the controllable selection of the sampling rates of the data. It will also be appreciated that although specific embodiments of invention have been described in detail for purposes of illustration, modification may be made without departing from the spirit and scope of the invention. Accordingly, the invention is not to be limited, except as by the appended claims.

What is claimed is:

1. A method for playing back a selected one of a plurality of discrete audio message units included in a block of composite digital audio data recorded on a record medium as a first sequential series of said plurality of discrete audio message units, and a second sequential series of a corresponding plurality of message pointer units, the entirety of said second sequential series occurring on the record medium upstream of the entirety of said first sequential series, said method comprising the steps of:

employing a player means for recovering said block of composite digital audio data from the record medium;

storing said recovered block of composite digital audio data within an address-accessible digital data storage means, each of said message pointer units being stored at fixed storage locations within said digital data storage means, and each of said audio message units being stored at predetermined storage locations within said digital data storage means, each said predetermined storage location having a predetermined starting address;

generating a coded message select signal identifying the selected one of said plurality of audio message units;

employing means operatively associated with said digital data storage means and responsive to said coded message select signal for retrieving said message pointing unit corresponding to said selected audio message unit from its said fixed storage location within said storage means, each said message pointer unit including address code information indicating said predetermined starting address of its corresponding said audio message unit;

deriving said address code information from said retrieved message pointer unit corresponding to said selected audio message unit;

employing means responsive to said derived address code information for retrieving said selected audio message unit from its said predetermined storage location;

decoding the retrieved said selected audio message unit; and, employing said player means to play back the decoded said selected audio message unit.

2. The method as set forth in claim 1, wherein said plurality of discrete audio message units are associated with a single frame of video information also recorded on the record medium.

3. The method as set forth in claim 1, wherein said composite digital audio data is stored on the record medium in a recording area normally reserved for the recording of video data.

4. The method as set forth in claim 3, wherein said video encoded composite digital audio data is in a time-compressed format.

5. The method as set forth in claim 1, wherein said composite digital audio data is stored on the record medium in a recording area normally reserved for the recording of audio data.

6. The method as set forth in claim 1, wherein each said message pointer unit further includes sampling rate code information indicating a predetermined digital sampling rate at which its corresponding said audio message unit is to be decoded in said decoding step.

7. The method as set forth in claim 6, further including the step of deriving said sampling rate code information from said retrieved message pointer unit corresponding to said selected audio message unit, and wherein further, said decoding step includes employing means responsive to said derived sampling rate code information for decoding the retrieved said selected audio message unit at said predetermined digital sampling rate indicated by said derived sampling rate code information.

8. The method as set forth in claim 1, wherein said fixed storage locations are sequentially addressed.

9. The method as set forth in claim 1, wherein said predetermined storage locations are sequentially addressed.

10. The method as set forth in claim 8, wherein said predetermined digital sampling rate indicated by said message pointer units is variable.

11. The method as set forth in claim 8, wherein at least preselected ones of said predetermined digital sampling rates are different from each other.

12. The method as set forth in claim 1, wherein the length of said plurality of discrete audio message units is variable.

13. The method as set forth in claim 1, wherein the length of at least preselected successive ones of said audio message units differs.

14. The method as set forth in claim 1, wherein said plurality of discrete audio message units are discretely associated with a single frame of video information also recorded on the record medium.

15. The method as set forth in claim 14, further including the steps of:

employing said player means for playing back said single frame of video information associated with said plurality of discrete audio message units, from the record medium, in a stop-motion mode of operation, in conjunction with said step of employing said player means to play back the decoded said selected audio message unit.

* * * * *